United States Patent [19]
Yang

[11] Patent Number: 5,633,794
[45] Date of Patent: May 27, 1997

[54] DATA COMMUNICATION SYSTEM CAPABLE OF BYPASSING MALFUNCTIONING RELAY UNITS

[75] Inventor: Jing Yang, Aichi-ken, Japan

[73] Assignees: Brother Kogyo Kabushiki Kaisha; Xing Inc., both of Nagoya, Japan

[21] Appl. No.: 371,745

[22] Filed: Jan. 12, 1995

[30] Foreign Application Priority Data

Jan. 12, 1994 [JP] Japan .................................. 6-001673

[51] Int. Cl.$^6$ ............................. H04Q 11/00; G06F 9/00
[52] U.S. Cl. .............. 364/140; 340/870.02; 340/825.06; 340/310.01; 340/825.02; 455/33.2; 364/483
[58] Field of Search ................... 395/182.02, 200; 340/425.1, 870, 58, 35, 825, 310; 364/140, 483

[56] References Cited

U.S. PATENT DOCUMENTS

| | | | |
|---|---|---|---|
| 4,210,783 | 7/1980 | Vicari et al. | 379/214 |
| 4,302,750 | 11/1981 | Wadhwani et al. | 340/870.02 |
| 4,980,677 | 12/1990 | Hotta et al. | 340/825.06 |
| 5,008,827 | 4/1991 | Sansone et al. | 364/464.02 |
| 5,012,120 | 4/1991 | Minagawa et al. | 370/35 |
| 5,067,127 | 11/1991 | Ochiai | 370/58.1 |
| 5,301,122 | 4/1994 | Halpern | 364/483 |
| 5,446,733 | 8/1995 | Tsuruoka | 370/60.1 |
| 5,455,761 | 10/1995 | Kushiro et al. | 364/140 |
| 5,473,322 | 12/1995 | Carney | 340/870.02 |
| 5,485,400 | 1/1996 | Warrior et al. | 364/550 |
| 5,488,715 | 1/1996 | Wainwright | 395/182.02 |
| 5,495,406 | 2/1996 | Kushiro et al. | 364/140 |

*Primary Examiner*—Christopher B. Shin
*Attorney, Agent, or Firm*—Oliff & Berridge

[57] ABSTRACT

In a data communication system having a network composed of a central facility, a plurality of relay units, and a plurality of terminal units, traffic information, which may contain information about a number of calls and a total amount of communication time occurred with respect to each relay unit over the predetermined interval, is sent from the relay units to a communication control unit. A ROM stores a threshold value for each relay unit and comparison is made to compare the received traffic information with the corresponding threshold value. Then, the is determined whether the subject relay unit is in a high-load condition. If so, relay units and terminal units that are scheduled to call the high-load relay unit are detected so that those units bypass the high-load relay unit.

21 Claims, 2 Drawing Sheets

DATA COMMUNICATION SYSTEM CAPABLE OF BYPASSING MALFUNCTIONING RELAY UNITS

BACKGROUND OF THE INVENTION

1. Field of the Invention

The present invention relate generally to a data communication system having a network in which relay units connect a central facility with a plurality of terminal units. The terminal units and the relay units carry out data communications in accordance with internal programs contained in the respective units. The present invention relates more particularly to a communication control apparatus used in the data communication system.

2. Description of the Related Art

In a data communication system having a network composed of a central facility, a plurality of relay units, and a plurality of terminal units, the central facility governs all aspects of the data communications including data transmissions and detection of the operating conditions of the respective relay units and the terminal units. The relay units serve as a backup to the central facility and prevents the entire system from breaking down upon failure of the central facility. The relay units transmit data locally to reduce transmission charges. The relay units also ease the load on the central facility.

Conventionally, a predetermined program stored in each relay unit governs transmission of data from the relay unit to its subordinate terminal units or, when superior and inferior relay units are provided in separate levels, from the relay units in one level to the relay units in another level.

Transmission is performed between the terminal units and relay units in an order predetermined by their internal programs. The internal programs are designed to perform transmission efficiently presuming that conditions for transmitting are optimum, that is, when transmission is not impeded in any way.

The internal programs are designed to determine whether the subject unit can communicate with a certain remote unit by attempting to communicate with that remote unit. If the attempt ends in failure, the programs are designed either to again attempt to communicate with the same remote unit or to attempt to communicate with another remote unit. In other words, there is always a possibility that attempts to communicate with a remote unit will be unsuccessful, but whether communication with a certain remote unit is possible or not can not be ascertained until an attempt is made to communicate. This can result in many superfluous attempts to transmit when the subject remote unit is in a non-communicable condition. This delays the start of data transmission.

Sometimes the central facility is adapted to collect and check the logs sent from the relay units in order to determine whether communication with any of the relay units is being impeded. However, the central facility can collect logs from relay units only during certain time periods. Therefore, a malfunctioning until will not be discovered until a time period arrives when the logs can be checked.

SUMMARY OF THE INVENTION

It is therefore, an object of the present invention to overcome the above-described drawbacks, and to provide a transmission control unit for a data communication system.

According to the present invention, the data communication system has a network composed of a central facility, a plurality of relay units, and a plurality of terminal units. The transmission control unit includes ISDN lines and an ISDN board serving as reception means for receiving traffic information from each of the plurality of relay units. The traffic information is representative of a condition of data transmission and may contain information about at least one of a number of calls and a total amount of communication time which occurred with respect to each of the plurality of relay units over the predetermined interval. A microcomputer included in the transmission control unit serves as threshold value storage means for storing a predetermined threshold value with respect to each of the plurality of relay units. The microcomputer also serves as high-load determining means for comparing the traffic information received through the reception means with a corresponding threshold value stored in the threshold value storage means and for determining whether a subject relay unit is in a high-load condition. The microcomputer further serves as detection means for detecting preselected relay units and terminal units that are scheduled to call a high-load relay unit determined by the high-load determining means as being in the high-load condition. Then the microcomputer serves as setting means for setting an alternate relay unit for each of the preselected relay units and terminal units to call in place of the high-load relay unit.

The microcomputer of the transmission control unit may further serve as irregularity judgement means for judging whether any of the plurality of relay units is operating irregularly. In this connection, the reception means further receives operation information from each of the plurality of relay units. The operation information is representative of an operating condition in relation to data communication. The judgement made by the irregularity judgement means is based on the operation information included in the traffic information. In a preferred embodiment, a CRT is provided which serves as notification means for notifying an operator of an irregularly operating relay unit according to the judgement made by the irregularity judgement means.

Each of the plurality of relay units and each of the plurality of terminal units are provided with a predetermined internal program according to which communicable remote units are determined.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
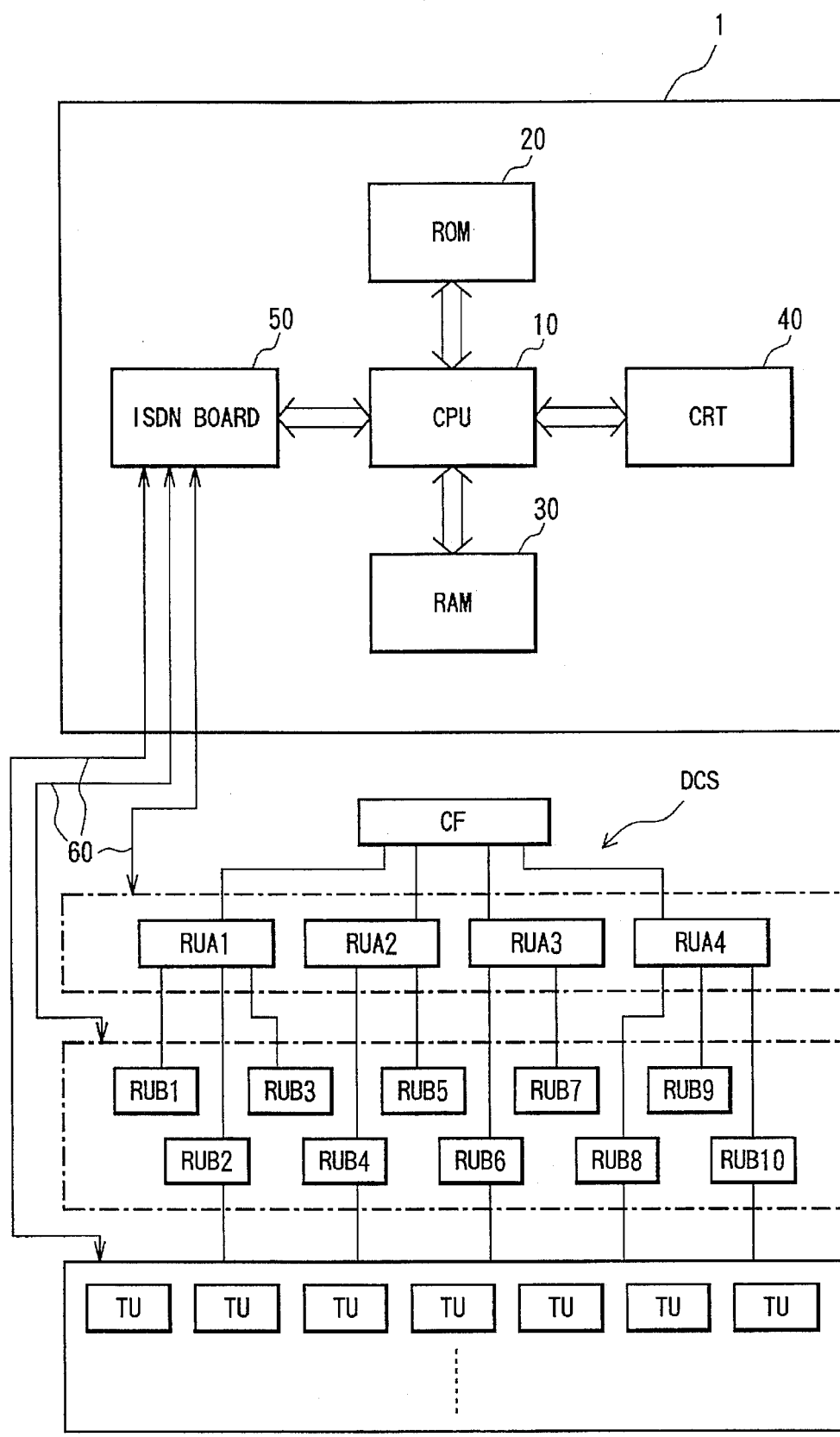
FIG. 1 is a block diagram showing an arrangement of a communication control unit including an illustrative data communication system.

A data communication system according to a preferred embodiment of the present invention will be described while referring to the accompanying drawings wherein like parts and components are designated by the same reference numerals to avoid duplicating description.

As shown in FIG. 1, a communication control unit 1 is provided for controlling a data communication system DCS which includes a central facility CF, relay units RU, and terminal units TU. The relay units RU are divided into two groups: a group of superior relay units RUA and a group of inferior relay units RUB. To facilitate the following description, the reference RU will be used when referring to relay units as a group, which includes the superior and inferior relay units; the reference RUA will be used when referring to the superior relay units as a group; and the reference RUB will be used when referring to the inferior relay units as a group. Individual relay units will be referred to by adding its particular reference number, for example, RU+A1 for a particular superior relay unit.

Each of the four superior relay units RUA shown in FIG. 1 is set by their internal programs to govern over and to relay data to and from predetermined units of the ten inferior relay units RUB. In the present embodiment, the superior relay unit RUA1 is set to govern the inferior relay units RUB1 through RUB3; the superior relay unit RUA2 is set to govern the inferior relay units RUB4 and RUB5; the superior relay unit RUA3 is set to govern the inferior relay units RUB6 and RUB7; and the superior relay unit RUA4 is set to govern the inferior relay units RUB8 through RUB10. However, these settings are mere exemplary. Each superior relay unit RUA can be set according to its internal program to govern various combinations of inferior relay units RUB.

Similarly, the inferior relay units RUB are set to govern predetermined terminal units TU. However, details of connections between the inferior relay units RUB and the terminal units TU have been omitted from FIG. 1.

Integrated service digital network (ISDN) lines 50 allow two-way communication between the central facility CF and the superior relay units RUA, between each superior relay unit RUA and its subordinate inferior relay units RUB, and between each inferior relay unit RUB and its subordinate terminal units TU.

The communication control unit 1 controls the relay units RU in the data communication system DCS and includes a central processing unit (CPU) 10, a read-only memory (ROM) 20, a random access memory (RAM) 30, a cathode ray tube (CRT) 40, and an ISDN board 50.

The CPU 10 executes a sequence of predetermined processes in accordance with a program stored in the ROM 20, and serves as a threshold value storage means, a high-load determining means, a detection means, a setting or bypassing means, and an irregularity judgement means. RAM 30 is a work area for executing the operations in accordance with each means mentioned above. The threshold value storage means stores a predetermined threshold value for determining whether or not traffic information on any of the relay units RU indicates a high-load condition. The method of setting the threshold value can vary depending on the data communication system to which it will be applied. For example, one threshold value may be stored and the same threshold value applied to all relay units RU. Alternately, two threshold values, one for the superior relay units RUA and another for the inferior relay units RUB, can be determined and stored in the ROM 20. Another alternative method is to determine and store separate threshold values for each relay unit RU.

The high-load determining means compares traffic information from each relay unit RU with the corresponding threshold value in order to determine whether the subject relay unit RU is in a high-load condition. When one of the relay units RU is determined to be in a high-load condition, the detection means detects all relay units RU and terminal units TU that are scheduled to call the high-load relay unit. For example, the detection means detects which inferior relay units RUB are scheduled to call a high-load superior relay unit RUA and which superior relay units RUA or terminal units TU are scheduled to call a high-load inferior relay unit RUB.

When more than one central facility CF is provided, because two-way communication is possible between the central facility CF and the superior relay units RUA, the detection means can also be adapted for detecting which central facilities CF a high-load superior relay unit RUA are scheduled to call. However, this is not the case in the present embodiment because only one central facility CF is provided.

ISDN lines 60 connect the ISDN board 50 with each of the four superior relay units RUA1 through RUA4, each of the ten inferior relay units RUB1 through RUB10, and with each terminal unit TU, thus allowing the ISDN board 50 to transmit data to and receive data from each relay unit RU and each terminal unit TU.

Figure 2:
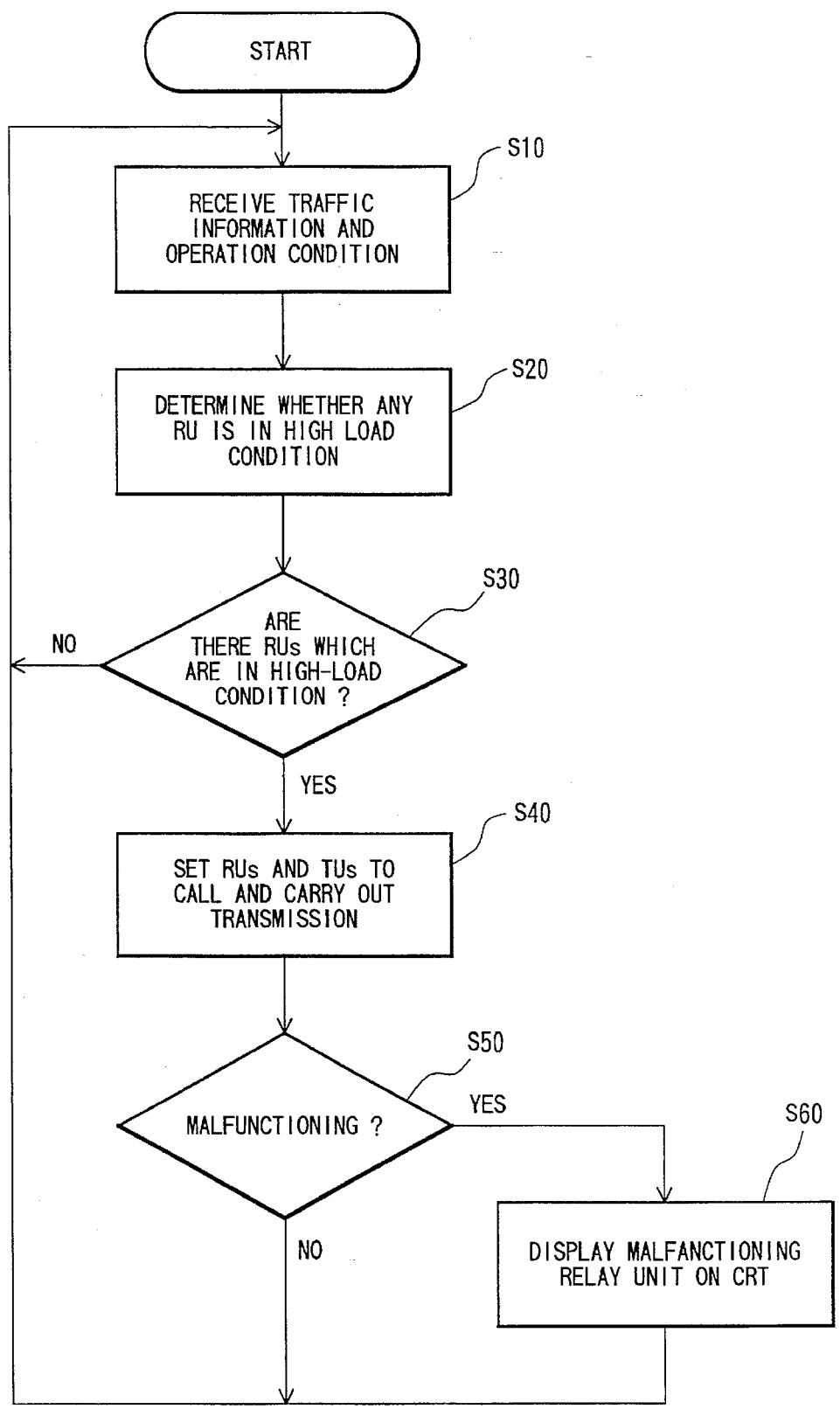
FIG. 2 is a flowchart illustrating an operation performed by the communication control unit shown in FIG. 1.

Next, a description of the operation of the communication control unit 1 according to the present invention will be provided while referring to FIG. 2. The flowchart shown in FIG. 2 represents operations of a transmission control routine in the communication control unit 1. This routine is performed regularly after each passage of a predetermined interval of time. The reference numbers Si (i=1, 2, 3, . . . ) in FIG. 2 refer to separate steps in the routine.

The operation condition and traffic information on relay units RU are inputted via the ISDN lines 60 and the ISDN board 50 (S10). Whether any relay unit RU is in a high-load condition or not is determined based on the inputted traffic information of each relay unit RU (S20) in the following manner. Each superior relay unit RUA and each inferior relay unit RUB transmit traffic information to the communiction control unit 1 at a predetermined interval, for example every 10 minutes. The traffic information represents a condition of data communication and contains two types of information, that is, the number of calls and the total amount of communication time which occurred in regards to the subject relay unit RU over the last predetermined interval, i.e., the last ten minute period in this example. The traffic information of the subject relay unit RU is compared with the corresponding threshold value stored in the ROM 20. If the traffic information of the relay unit RU exceeds the threshold value, then that relay unit RU is determined to be in a high-load condition. When a different threshold value is stored for each relay unit RU as stated previously, threshold values are compared with the traffic information transmitted from the corresponding relay unit RU. When the same threshold value is stored for all relay units RU, the one threshold value is compared with all incoming traffic information.

The determination in S20 can be performed by setting separate threshold values for number of calls and for communication time and comparing each threshold value with the corresponding information contained in the incoming traffic information. In this case, a relay unit RU can be determined to be in a high-load condition when the two types of information contained in the traffic information exceed the corresponding threshold values. Alternatively, a relay unit RU can be determined as being in a high-load condition when either of the two types of information contained in the traffic information exceeds the corresponding threshold value. For example, the relay unit RU is determined as being in the high-load condition when only the actual total communication time exceeds the threshold value for the total communication time. The determination in S20 can also be the result of comparing a product of the two types of information contained in the traffic information with the product of both threshold values.

After the determination process in S20, if none of the relay units RU are in a high-load condition (i.e., S30 is NO), then the routine returns to S10, whereupon S10 and subsequent steps are repeated. If one or more relay units RU are in a high-load condition (i.e., S30 is YES), then the routine proceeds to S40.

In S40, the internal programs of the relay units RU or terminal units TU that are scheduled to call a high-load relay unit RU are set with an alternate relay unit RU for the relay units RU and the terminal unit TU to call. Transmission is then carried out via the alternate relay unit RU, the ISDN board 50, and the ISDN lines 60.

As described above, when a superior relay unit RUA falls into a high-load condition, the inferior relay units RUB are checked to determine whether they are scheduled to call the high-load superior relay unit RUA. When an inferior relay unit RUB is in a high-load condition, the superior relay units RUA and terminal units TU are checked to determine whether they are scheduled to call the high-load inferior relay unit RUB. It should be noted that connections between the superior relay units RUA and the inferior relay units RUB and between inferior relay units RUB and terminal units TU shown in FIG. 1 are merely exemplary. Actual connections are set according to internal programs of the relay units RU. Therefore all superior relay units RUA, inferior relay units RUB, and terminal units TU can become the subject of the detection to determine whether they are scheduled to call the high-load relay units RU.

To facilitate understanding, a comparison will be made of operations followed in a conventional system and operations followed in a system according to the present invention. In the following description, a superior relay unit RUA1 is set to sequentially transmit data from the central facility CF to inferior relay units RUB1, RUB2 and RUB3 in the recited order according to its internal program. As described above, the superior relay unit RUA1 governs the three inferior relay units RUB1 through RUB3. When an attempt to transmit data is unsuccessful, transmission is reattempted a predetermined number of times.

In a conventional system, when the inferior relay unit RUB1 falls into a high-load condition, the internal program of superior relay unit RUA1 will control the superior relay unit RUA1 to reattempt transmission to inferior relay unit RUB1 the predetermined number of times. When these subsequent attempts to transmit are also unsuccessful, transmission is next attempted with inferior relay unit RUB2. If inferior relay unit RUB2 is also in a high-load condition so that transmission is impossible even after the predetermined number of attempts, the internal program will cause the superior relay unit RUA1 to attempt transmission with inferior relay unit RUB3.

In contrast to this, when the inferior relay units RUB1 and RUB2 are detected as being in a high-load condition according to the invention, transmission will immediately be made to the inferior relay unit RUB3 without attempting to transmit to either of the inferior relay units RUB1 or RUB2.

When the inferior relay unit RUB3 is also in a high-load condition, the conventional superior relay unit RUA1 will be unable to transmit data until the high-load condition of one of the inferior relay units RUB1 through RUB3 it governs is corrected. According to the present invention, however, transmission is possible with the inferior relay units RUB governed by the adjacent superior relay units RUA4 and RUB5. This allows transmission without wasted transmission time.

A description will be provided for the present invention applied to a data communication system for transmitting information on karaoke music (recorded instrumental music for accompanying live singing). In this example, it will be assumed that superior relay units RUA1, RUA2, RUA3, and RUA4 govern inferior relay units RUB in the Northeast (the New England States including New York State in this example), Southeast, Midwest, and West Coast respectively of the United States. The system according to the present invention can be designed so that when the superior relay unit RUA1 can not transmit to any of the inferior relay units RUB in its jurisdiction in the Northeast, other superior relay units RUA will transmit to subordinate inferior relay units RUB in locations that are geographically close to the Northeast. For example, data that is scheduled to be transmitted from the superior relay unit RUA1 to an inferior relay unit RUB in Pittsburgh, Pa., could be transmitted from the superior relay unit RUA2 to an inferior relay unit RUB in Cincinnati, Ohio. As another example, data that is scheduled to be transmitted from the superior relay unit RUA1 to an inferior relay unit RUB in New York, N.Y. could be transmitted from the superior relay unit RUA3 to an inferior relay unit RUB in Washington, DC. Although an almost unlimited number of alternative routes are conceivable for transmitting data from superior relay units RUA to the inferior relay units RUB, physical proximity of superior relay units RUA to alternate inferior relay units RUB should be taken into consideration to minimize transmission costs.

The present invention can also be applied for transmission of data from inferior relay units RUB to superior relay units RUA in the same manner as described above for transmission from superior relay units RUA to inferior relay units RUB. For example, when the inferior relay unit RUB3 is, as described above, in the Northeast region governed by the RUA1, the system can be controlled so that when the superior relay unit RUA1 falls into a high-load condition, the inferior relay unit RUB3 can transmit to the superior relay unit RUA2.

Referring back to FIG. 2, whether a unit is operating smoothly or malfunctioning is checked in S50 based on the operation conditions inputted in S10 about the relay units RU. In the present embodiment, each relay unit RU determines itself whether it is operating smoothly or is malfunctioning and transmits the resultant information. When a relay unit RU determines that it is malfunctioning, the program proceeds to S60, where a message that says the relay units RU is malfunctioning is displayed on the CRT 40. When the relay units RU is operating normally, the program returns to S10, whereupon S10 and following steps are repeated. When a message about a malfunctioning unit is displayed, the superintendent observing the CRT 40 can contact the person responsible for the corresponding region, who can then take appropriate action. When transmission becomes impossible, information on smoothness of operations and malfunctions can not be transmitted. To overcome this problem, the communication control unit 1 can, for example, be set to determine that a relay unit RU is malfunctioning in a manner that makes transmission impossible by whether that relay unit RU has transmitted a standard number of times over a predetermined amount of time.

When a relay unit RU falls into a high-load condition in a communication control unit 1 according to the present invention, those relay units RU and terminal units TU that the high-load relay unit RU is scheduled to call are detected. The detected relay units RU and terminal units TU can be set a different transmission target in place of the malfunctioning relay unit RU. Accordingly, even when transmission can not be smoothly performed according to the preset internal program, a remote unit with which communication is possible can be detected, and transmission can be performed promptly with that remote unit.

While the invention has been described in detail with reference to specific embodiments thereof, it would be apparent to those skilled in the art that various changes and modifications may be made therein without departing from the spirit of the invention, the scope of which is defined by the attached claims.

For example, although in the preferred embodiment traffic information for determining whether a unit is in a high-load condition is transmitted every ten minutes, the shorter the time between transmitting traffic information the better. Ideally traffic information should be transmitted at a real time basis, but processing information on all relay units on real time can become cumbersome when the communication network includes a great number of relay units.

What is claimed is:

1. A communication control unit for a data communication system having a network comprising a central facility, a plurality of relay units, and a plurality of terminal units, wherein bi-directional data communication is established between at least one of said central facility and each of said plurality of relay units, two of said plurality of relay units, and each of said plurality of relay units and each of said plurality of terminal units, and wherein at least one of said plurality of relay units relays down-stream data originated from said central facility to a designated terminal unit or up-stream data originated from said designated terminal unit to said central facility, the communication control unit comprising:

reception means for receiving traffic information from each of said plurality of relay units, said traffic information representative of a condition of data communication;

threshold value storage means for storing at least one predetermined threshold value, each predetermined threshold value corresponding to at least one of said plurality of relay units;

high-load determining means for comparing, for at least one of said plurality of relay units, said traffic information received through said reception means with a corresponding one of the at least one threshold value stored in said threshold value storage means and for determining whether the at least one relay unit is in a high-load condition;

detection means for detecting relay units and terminal units that are scheduled to send the data to a high-load relay unit which is determined by said high-load determining means to be in the high-load condition; and setting means for setting at least one alternative relay unit for the high-load relay unit, said relay units and terminal units sending the data to said at least one alternative relay unit instead of said high-load relay unit.

2. The communication control unit according to claim 1, further comprising:

irregularity judgement means for judging whether any of said plurality of relay units is operating irregularly; and notification means for notifying an operator of an irregularly operating relay unit according to the judgement made by said irregularity judgement means, wherein said reception means further receives operation information from each of said plurality of relay units, the operation information being representative of an operating condition in relation to data communication, wherein the judgement made by said irregularity judgement means is based on said operation information included in the traffic information.

3. The communication control unit according to claim 2, wherein said notification means comprises message indicating means for identifying the irregularly operating relay unit and indicating that the identified relay unit is irregularly operating.

4. The communication control unit according to claim 1, wherein said threshold value storage means stores one threshold value applied commonly to all of said relay units.

5. The communication control unit according to claim 1, wherein said plurality of relay units include superior relay units and inferior relay units, the bi-directional data communication established between at least one of said central facility and each of the superior relay units, each of said superior relay units and each of said inferior relay units, and each of said inferior relay units and each of said plurality of terminal units, and wherein said threshold value storage means stores two threshold values, one of said two threshold values applied commonly to all of said superior relay units and another of said two threshold values applied commonly to all of said inferior relay units.

6. The communication control unit according to claim 1, wherein said threshold value storage means stores separate threshold values for each of said plurality of relay units.

7. The communication control unit according to claim 1, wherein said reception means receives said traffic information at a predetermined interval.

8. The communication control unit according to claim 7, wherein said traffic information contains information about at least one of a number of calls and a total amount of communication time which occurred with respect to each of said plurality of relay units over the predetermined interval.

9. The communication control unit according to claim 8, wherein said threshold value storage means stores a first threshold value representative of the number of calls and a second threshold value representative of the total amount of communication time with respect to each of said plurality of relay units.

10. The communication control unit according to claim 9, wherein said high-load determining means determines that the subject relay unit is in the high-load condition when both the number of calls and the total amount of communication time contained in said traffic information exceed the corresponding first and second threshold values, respectively.

11. The communication control unit according to claim 9, wherein said high-load determining means determines that the subject relay unit is in the high-load condition when either the number of calls or the total amount of communication time contained in said traffic information exceeds the corresponding first or second threshold value.

12. The communication control unit according to claim 9, wherein said high-load determining means determines that the subject relay unit is in the high-load condition when a product of the number of calls and the total amount of communication time contained in said traffic information exceeds a product of the corresponding first and second threshold values.

13. The communication control unit according to claim 1, wherein the detection means detects the relay units and terminal units for high load relay units which have been requested by the control facility to relay the data to the at least one central facility.

14. A communication control unit for a data communication system having a network comprising a central facility, a plurality of relay units, and a plurality of terminal units, wherein bi-directional data communication is established between at least one of said central facility and each of said plurality of relay units, two of said plurality of relay units, and each of said plurality of relay units and each of said plurality of terminal units, and wherein at least one of said plurality of relay units relays down-stream data originated from said central facility to a designated terminal unit or up-stream data originated from said designated terminal unit to said central facility, the communication control unit comprising:

reception means for receiving traffic information from each of said plurality of relay units, said traffic information representative of a condition of data transmission;

threshold value storage means for storing at least one predetermined threshold value, each predetermined threshold value corresponding to at least one of said plurality of relay units;

high-load determining means for comparing, for at least one of said plurality of relay units, said traffic information received through said reception means with a corresponding one of the at least one threshold value stored in said threshold value storage means and for determining whether the at least one relay unit is in a high-load condition;

detection means for detecting relay units and terminal units that are programmed to send data to a high-load relay unit which is determined by said high-load determining means to be in the high-load condition; and bypassing means for bypassing said high-load relay unit when said relay units and terminal units attempt to send the data to said high-load relay unit.

15. The communication and control unit according to claim 14, further comprising:

irregularity judgement means for judging whether any of said plurality of relay units is operating irregularly; and notification means for notifying an operator of an irregularly operating relay unit according to the judgement made by said irregularity judgement means, wherein said reception means further receives operation information from each of said plurality of relay units, the operation information being representative of an operating condition in relation to data communication, wherein the judgement made by said irregularity judgement means is based on said operation information included in the traffic information.

16. The communication control unit according to claim 14, wherein said reception means receives said traffic information at a predetermined interval.

17. The communication control unit according to claim 16, wherein said traffic information contains information about at least one of a number of calls and a total amount of communication time which occurred with respect to each of said plurality of relay units over the predetermined interval.

18. The communication control unit according to claim 17, wherein said threshold value storage means stores a first threshold value representative of the number of calls and a second threshold value representative of the total amount of communication time with respect to each of said plurality of relay units.

19. A data communication system, comprising:

a network in which a plurality of relay units connect a central facility with a plurality of terminal units, each of said plurality of relay units and each of said plurality of terminal units provided with a predetermined internal program according to which ones of said relay units and terminal units that can communicate are determined, wherein at least one of said plurality of relay units relays down-stream data originated from said central facility to a designated terminal unit or up-stream data originated from said designated terminal unit to said central facility; and a communication control unit comprising:

reception means for receiving traffic information from each of said plurality of relay units, said traffic information representative of a condition of data transmission, threshold value storage means for storing at least one predetermined threshold value, each predetermined threshold value corresponding to at least one of said plurality of relay units, high-load determining means for comparing, for at least one of said plurality of relay units, said traffic information received through said reception means with a corresponding threshold value stored in said threshold value storage means and for determining whether the at least one relay unit is in a high-load condition, detection means for detecting relay units and terminal units that are programmed to send data to a high-load relay unit which is determined by said high-load determining means to be in the high-load condition, and setting means for setting at least one alternative relay unit for the high-load relay unit, said relay units and terminal units sending the data to said at least one alternative relay unit in place of said high-load relay unit.

20. The data communication system according to claim 19, wherein said setting means bypasses said high-load relay unit when said relay units and terminal units are programmable to send data to said high-load relay units.

21. A communication control unit for a data communication system having a network comprising a central facility, a plurality of relay units, and a plurality of terminal units, wherein bi-directional data communication is established between at least one of said central facility and each of said plurality of relay units, two of said plurality of relay units, and each of said plurality of relay units and each of said plurality of terminal units, and wherein at least one of said plurality of relay units relays at least one of down-stream data originated from said central facility to a designated terminal unit and up-stream data originated from said designated terminal unit to said central facility, the communication control unit comprising:

reception means for receiving traffic information at a predetermined interval from each of said plurality of relay units, said traffic information representative of a condition of data communication;

threshold value storage means for storing at least one predetermined threshold value, each predetermined threshold value corresponding to at least one of said plurality of relay units;

high-load determining means for comparing, for at least one subject relay units, said traffic information received through said reception means with a corresponding threshold value stored in said threshold value storage means and for determining whether each of the at least one relay unit is in a high-load condition;

detection means for detecting ones of said central facility, said plurality of relay units and said plurality of terminal units that are programmed to send data to each of said at least one subject relay unit that is in the high-load condition; and setting means for setting at least one alternative relay unit in place of each of said at least one subject relay unit which is determined by said high-load determining means to be in the high-load condition, and for reprogramming said ones of said central facility, said plurality of relay units and said plurality of terminal units to select said at least one alternative relay unit for each of said at least one subject relay unit that is in the high-load condition.

* * * * *